United States Patent [19]
Dormon

[11] Patent Number: 5,367,127
[45] Date of Patent: Nov. 22, 1994

[54] LINE ORGANIZING DEVICE

[76] Inventor: William B. Dormon, 25615 NW. Pumpkin Ridge Rd., Cornelius, Oreg. 97113

[21] Appl. No.: 891,226

[22] Filed: May 29, 1992

[51] Int. Cl.$^5$ .................... H02G 1/00; E02F 5/10
[52] U.S. Cl. .................... 174/146; 174/37; 248/68.1; 206/443; 206/486
[58] Field of Search ............... 174/146, 72 A, 97, 96, 174/99 R, 37; 248/49, 68.1; 211/60.1, 70.1; 206/443, 486; 405/154

[56] References Cited

U.S. PATENT DOCUMENTS

| | | | |
|---|---|---|---|
| 615,702 | 12/1898 | Hills | 206/486 |
| 1,334,545 | 3/1920 | Londelius, Jr. | 211/70.1 X |
| 1,370,525 | 3/1921 | Eisenkraft | 206/443 X |
| 2,937,833 | 5/1960 | Sachs | 248/49 |
| 3,188,030 | 6/1965 | Fischer | 248/68.1 |
| 3,233,383 | 2/1966 | Salm | 52/687 |
| 3,311,232 | 3/1967 | Howell | 206/443 |
| 3,368,564 | 2/1968 | Selix | 604/180 |
| 3,944,719 | 3/1976 | Rubey | 174/72 A |
| 4,181,220 | 1/1980 | Zicko | 206/315.2 |
| 4,183,484 | 1/1980 | Mathews | 248/49 |
| 4,244,542 | 1/1981 | Mathews | 248/49 |
| 4,366,939 | 1/1983 | McMillan | 248/68.1 |
| 4,391,426 | 7/1983 | Göthberg | 174/97 X |
| 4,511,107 | 4/1985 | Funk | 248/74.1 |
| 4,654,967 | 4/1987 | Thenner | 174/72 A X |
| 4,660,790 | 4/1987 | Muz | 248/68.1 |

FOREIGN PATENT DOCUMENTS

| | | | |
|---|---|---|---|
| 2715394 | 10/1978 | Germany | 248/68.1 |
| 0659513 | 1/1987 | Switzerland | 248/49 |

*Primary Examiner*—Leo P. Picard
*Assistant Examiner*—Hyung S. Sough
*Attorney, Agent, or Firm*—Kolisch, Hartwell, Dickinson, McCormack & Heuser

[57] ABSTRACT

A device is provided for use in maintaining organization of lines which pass through a trench. The device includes a thin, substantially planar foundation and at least one separating member projecting normally therefrom. The foundation is suited for placement within a trench to directly underlie lines. The separating member is operatively associated with the foundation, acting as a spacer between adjacent lines. In order to provide a readily transportable and storable device, the invented line organizer is constructed from a single, thin sheet of generally rigid material. The sheet is foldable to provide a generally triangular device.

3 Claims, 1 Drawing Sheet

U.S. Patent     Nov. 22, 1994     5,367,127
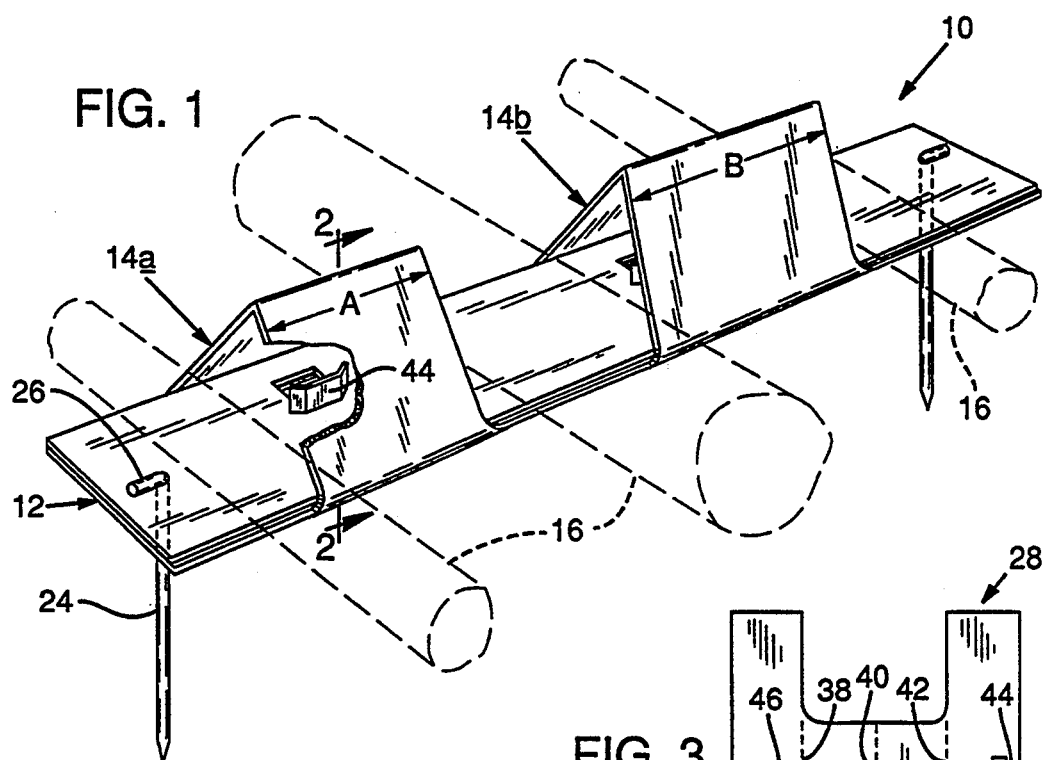
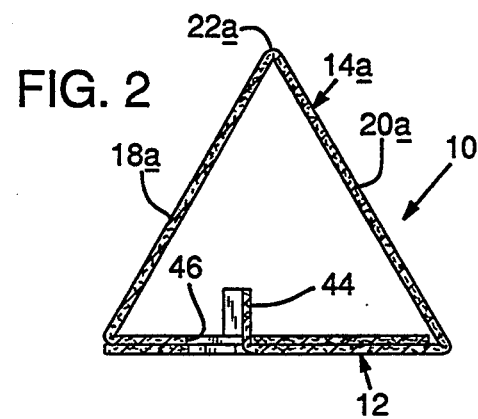
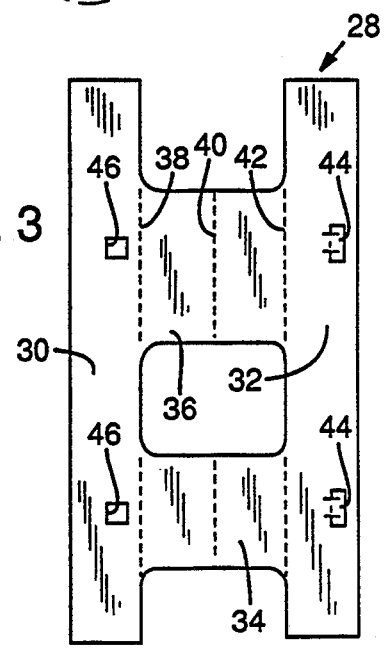
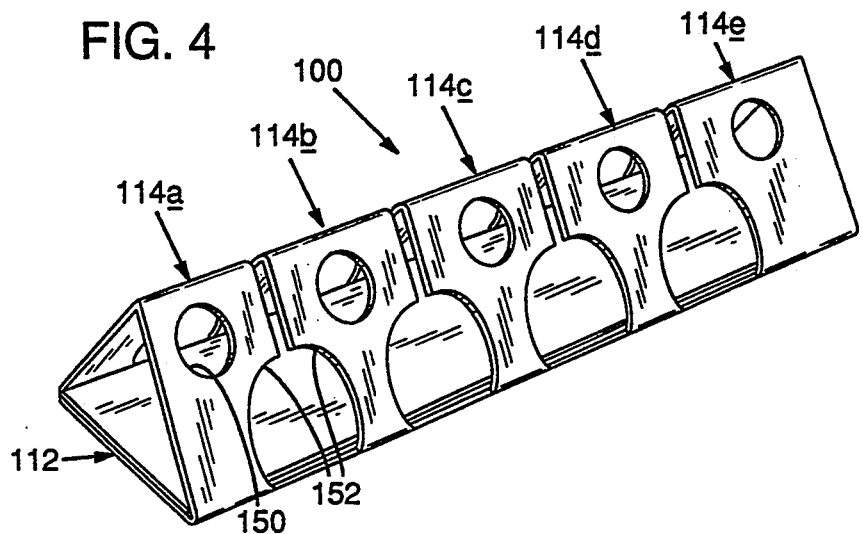

LINE ORGANIZING DEVICE

BACKGROUND OF THE INVENTION

The present invention relates generally to devices for use in maintaining organization of lines such as cables, conduits and pipes. More particularly, the invention relates to a device which selectively maintains a predetermined spacial relationship between lines such as utility lines as they pass through a trench in the earth.

It has long been conventional practice to lay lines such as utility lines in trenches and then to close such trenches by the introduction of fill, burying the lines therein. The lines are thus hidden from view and separated from the public. The above-described practice has thus proven extremely beneficial, particularly inasmuch as it has served to protect the lines from damage and to insulate the public from danger.

Despite these advantages, however, the installation and maintenance of underground lines has presented a variety of nagging problems. An excellent illustration of such problems is available in the field of new construction, where it is necessary to run a number of characteristically different lines to the a single building site. Power, gas, telephone, cable TV, and water lines are, for example, all commonly run to a new home. In such an instance, problems relating to available space often arise, such problems being compounded by factors related to time and money. To address these problems, it is generally necessary to run more than one line through a single trench, cutting back on wasted space and installation time and thus on unnecessary expenses.

Generally, lines are placed in a trench by simply throwing them into position, the lines landing haphazardly and usually running in close proximity to one another. Such an arrangement, however, may lead to various undesirable effects, detracting from the above-described benefits. Lines in close proximity to one another, for example, may cause signal interference, difficulty in repairing or replacing the lines, or even damage to the lines. Additionally, utility company specifications and municipal code requirements often dictate that a minimum separation be maintained between adjacent lines as well as between the lines and the sides of the trench.

Because a minimum separation is generally required along the entire length of the trench, it is often impossible to simply drop the lines in place and close the trench. Instead, it may be necessary to carefully position the lines and even to measure the space between the lines to ensure proper separation. Such a procedure would involve considerable time and, consequently, considerable cost. It is therefore an object of this invention to provide an improved device which allows for simplified placement of lines in proper spaced relation.

Once the lines have been placed, it is necessary to ensure that the separation is maintained during trench closure and thereafter at least for a temporary period of time. Toward this end, traditional trench spacers have employed structure such as base plates or spacers to maintain such separation. A problem with such devices, however, has been that, upon introduction of fill, the lines move from their desired positions under the force of the fill. It is thus necessary to tie the lines to a base plate, the tie serving to hold the lines in place. Although effective, such an operation is time consuming, adding to the cost of running the lines. Accordingly, it is an object of this invention to provide an improved line organizing device which maintains a predetermined minimum separation between adjacent lines during closure of the trench.

Another approach in maintaining line separation has been to run lines through conduits and support the conduits in a complex matrix structure. In such structures, however, lines are often raised above the bottom of the trench, the lines being run substantial distances without support from below. Without such support, lines may sag, undergoing excessive bends and potentially leading to excessive wear or damage to the line. It is therefore an object of this invention to provide an improved line organizing device wherein the lines are not forced to undergo excessive weight-induced inflections as they pass through the trench.

Another important problem with previously known line organizing devices relates to complicated assembly procedures and to the lack of device portability. Conventional devices have proven inadequate due to the amount of space required to transport them in quantity to remote locations, as may be necessary when running lines through trenches along a road. It is therefore an object of this invention to provide an improved line organizing device, such device being readily transportable and easy to assemble.

SUMMARY OF THE INVENTION

In accordance with the present invention, a device is herein disclosed for use in maintaining organization of lines which pass through a trench. In its constructed form, the device includes a thin, substantially planar foundation and at least one separating member which projects normally therefrom. The foundation is suited for placement directly on the floor of the trench such that it may directly underlie the lines. The separating member is operatively associated with the foundation, acting as a spacer between adjacently running lines. The width of each separating member is predetermined, corresponding to a desired minimum separation between adjacent lines.

In order to provide a readily transportable and storable device, the invented line organizer is arranged such that it may be formed from a single, thin sheet of generally rigid material. The sheet includes at least one elongated base portion and at least one elongated, laterally-projecting spacer portion, the sheet being foldable to provide a generally triangular device. The sheet is folded along fold paths to complete construction.

BRIEF DESCRIPTION OF THE DRAWINGS

FIG. 1 is a perspective view illustrating a preferred embodiment of the invented line organizing device, the device being fully constructed.

FIG. 2 is a sectional view of the device taken along lines 2—2 of FIG. 1.

FIG. 3 is a plan view illustrating the sheet of material used in the line organizing device of FIG. 1, the sheet being shown prior to device construction.

FIG. 4 is a perspective view illustrating a fully constructed alternative embodiment of the invented line organizing device.

DETAILED DESCRIPTION OF THE PREFERRED EMBODIMENTS

As stated above, the present invention relates to a device for use in selectively maintaining a predetermined spacial relationship between lines as they pass through a trench in the earth. Although the device is suitable for use in separating virtually any lines, particular utility has been proven in the separation of utility lines, the separation of such lines generally being regulated by utility company specifications and municipal code requirements. The device also could be used in agricultural applications, i.e., to separate irrigation lines or conduits, etc.

Referring initially to FIGS. 1 and 2, a preferred embodiment of the invented line organizing device is shown, the device being indicated generally at 10. The invented device is generally portable, being adapted for transport to a trench which is to carry lines such as utility lines through the earth. As will be appreciated upon reading further, the invented device is formed from a thin, substantially planar sheet of material, such sheet being suited for construction in the field using a relatively simple procedure.

In its fully constructed form, the illustrated device includes a substantially planar foundation 12 and a pair of separating members 14a, 14b. Together, the foundation and separating members define the body of the device, such body being of a shape and size suitable for placement in the bottom of a to-be-filled trench. In order to maintain line spacing throughout the length of the trench, a number of line organizing devices may be placed within a trench, such devices being positioned at intervals of between 5-and 15-feet.

Turning now to a more complete description of the above-identified foundation, it should be recognized that foundation 12 is generally thin, being on the order of approximately ¼ inch thick. The foundation is preferably elongated, having a length of approximately 30-inches - a length corresponding to the most common trench width provided by a Case model 580 backhoe. As a result, the device may be used to verify trench width where such width must remain within certain predetermined parameters.

As indicated in FIG. 1, the foundation is adapted for directly underlying lines such as at 16. The device is suitable for use in separating a variety of lines including cables, conduits, and pipes. Commonly, telephone, gas, power, cable TV, and even water lines run through a single trench, each being suitable for passage over foundation 12 in the manner described above. Because the foundation is thin, lines within the trench experience only a minimal detour as they pass over the foundation and come back into contact with the bottom of the trench.

Having described the details of the foundation, attention may now be directed to the particular characteristics of the separating members, such members being identified generally at 14a and 14b in FIG. 1. As shown, the separating members project normally from foundation 12, acting as a pair of upstanding spacers.

It will be noted that each separating member has a predetermined width, the width of member 14a being identified as A and the width of member 14b being identified as B. Such widths correspond to the desired separations between the lines, generally being on the order of 4-, 5- or 6-inches in order to meet particular code and utility company requirements. Differing separations may be necessary, such separations being related to factors such as magnetic fields created by high-power-carrying lines, code requirements imposed by city, county or state governments or, quite simply, the necessity of being able to reach one line without disturbing another.

Bringing FIG. 2 into the discussion, attention is drawn to the fact that the depicted device has a generally triangular cross-section at positions along the device's separating members. As such, the fill introduced to effect closure of the trench will tend to slide down the sides of the member, mitigating against collapse of the same under the weight of the fill.

It will be appreciated that the identified triangular cross-section is due, in large part, to the shape of the constructed separating members, such members being in operative association with the foundation. As indicated in the drawing figures, the separating members preferably are convex in a direction normal to the plane of the foundation, which is to say they arch above the foundation. To provide such convexity, each separating member includes a pair of upstanding side walls such as those shown at 18a and 20a in FIG. 2. Such side walls preferably come together in a peak such as at 22a, the peak facing a direction normal to the plane of the foundation.

Referring again to FIG. 1, it will be noted that adjacent members 14a and 14b are spaced, defining a line-supporting channel therebetween. As was the case with the separating members, the channel may be of virtually any width, such width generally being predetermined according to the particular specifications of the lines which are to be carried. Although in the above-described embodiment the invention has been described as including two separating members, those skilled in the art will recognize that virtually any number of such separating members may be used, the number of separating members being dependent primarily upon the quantity of lines to be separated.

The triangular cross-section provides a rigid configuration, ensuring that lines mislaid during installation to lie on top of the peaks will not collapse the device. The lines can then be moved into the proper channel, and the separating members, such as shown at 14a, 14b will retain their upright configuration.

To secure the device within the trench, device 10 further includes a pair of elongated stakes such as at 24. The stakes pass through the foundation, each stake being held in association with the device body by a catch such as that shown at 26. As will be appreciated, the stakes may be driven into the earth, holding the body in place.

Turning now to FIG. 3, a thin, substantially planar sheet of generally rigid material is shown at 28, the sheet being suited for construction to provide the body of device 10. Because sheet 28 is planar prior to construction, and because sheet 28 forms the primary component of device 10, it will be appreciated that plural sheets may be stacked and transported for in-the-field construction. Sheet 28 is preferably formed from a lightweight material such as corrugated cardboard or plastic, making for a portable device. Preferably, as where cardboard is the chosen material, the device is biodegradable, decomposing over time. Corrugated material is particularly advantageous, as it lends itself to ready foldability, an aspect of importance in this invention.

Sheet 28 is preferably unitary, the sheet including a pair of elongated base portions 30, 32, and a pair of laterally projecting spacer portions 34, 36. In the depicted embodiment, the spacer portions extend between the base portions, intersecting oppositely therewith. As will be appreciated upon reading further, when the device is constructed, the base portions collectively define its foundation and the spacer portions each define a separating member. Looking at FIGS. 1 and 3 simultaneously, it will be appreciated that spacer portion 34 corresponds to separating member 14a and spacer portion 36 corresponds to separating member 14b.

Extending along sheet 28 are a plurality of fold paths (or fold axes) such as those indicated at 38, 40, and 42. Fold axis 38 coincides with the linear inner edge or margin of base portion 30, and fold axis 42 coincides with the linear inner edge or margin of base portion 32. To construct the device, the sheet is simply folded along these fold paths, the resulting folds being best illustrated in FIG. 2. As shown in FIG. 3, the first fold path 38 extends adjacent the intersection of base portion 30 and spacer portions 34, 36. The second fold path bisects the spacer portions. The third fold path extends adjacent the intersection of base portion 32 and spacer portions 34, 36. The space that separates a pair of separator or spacer portion 34, 36 is defined at its base by the inner margins of base portions 30, 32.

Referring for a moment to FIG. 2, the reader will see that folding of the sheet along the above-described fold paths allows for the overlap of the first and second base portions, or stacking of the base portions one above the other, thus providing a reinforced foundation on which lines may rest. Because the sheet is planar, folding thereof provides hollow separating members, the separating members thus being suited to receive fill during trench closure, adding integrity to the body and preventing its collapse.

As best shown in FIG. 3, but as also shown in FIGS. 1 and 2, sheet 28 is cut away at points along base portion 32 to provide a pair of integrally formed tabs such as at 44. Apertures 46, which correspond in size to such tabs, are similarly positioned along base portion 32. Upon folding of the sheet along the fold paths, the corresponding tabs and apertures align, the tabs thus being suited for insertion through the apertures, allowing interlocking engagement of the base regions to hold the body in its constructed form. As shown, the tabs and apertures are defined at positions corresponding to the separating members, the tabs projecting through the apertures and into the hollow separating members so as not to interfere with the lines as they run through the line-supporting channels.

In order to prevent collapse of the device, tab 44 is broadened adjacent its end, the broadened portion acting to better hold the tab in place as shown in FIGS. 1 and 2. It will be appreciated that the just-identified goal may be achieved by deformation of the broadened portion in order to allow initial passage through the aperture and, once through, again deforming the broadened portion to impede such passage in the opposite direction.

Referring now to FIG. 4, an alternative embodiment of the invention is shown, such alternative device being indicated generally at 100. As shown, device 100 includes a foundation 112 and a plurality of separating members 114a, 114b, 114c, 114d and 114e. The foundation is similar to foundation 12 of device 10, including a pair of overlapping base portions held together by a series of tab/aperture combinations. The separating members of device 100, however, differ from those of device 10 as will now be explained.

As indicated, device 100 defines a plurality of holes in the separating members such as at 150. Holes 150 communicate with the interiors of the separating members, providing for the collection of fill upon trench closure. Preferably, the holes face a direction generally normal to the plane of the base, allowing fill to enter the chamber under the force of gravity when the device is placed with its foundation resting on the floor of a trench.

As also indicated in FIG. 4, each pair of adjacent separating members collectively defines a line-supporting channel through which lines pass. Unlike the separating members of device 10, the separating members of device 100 include flanges such as at 152 which extend over the line-supporting channels. Flanges 152 substantially close access to the channel, thus acting to maintain lines within the channels.

Although preferred embodiments of the invention have been described herein, it should be appreciated that variations and modifications may be made without departing from the scope of the invention as defined by the claims.

What is claimed is:

1. A device for positioning lines in a trench comprising:

a sheet of stiff material including a first elongate base portion adapted to rest on the ground and a substantially parallel second elongate base portion stacked over and bearing against the first base portion, the sheet further including multiple spacer portions disposed in a row and spaced along the length of said stacked base portion, said spacer portions having one set of extremities joined through a first fold axis to said first base portion and another set of extremities joined through a second fold axis to said second base portion, said spacer portions between their extremities arching above the stacked base portions, said first base portion having an elongate linear margin substantially coincident with said first fold axis delineating one side of a space separating a pair of spacer portions, and said second base portion having a linear margin substantially coincident with said second fold axis delineating the opposite side of the space separating said pair of spacer portions, a line positioned by the device extending across said margins while supported intermediate said margins directly on said stacked base portions.

2. The device of claim 1, which further includes a stake extending through said first and second base portions securing the base portions together and being capable of securing the base portions to the base of a trench.

3. The device of claim 1, wherein said first and second base portions have respective end expanses disposed beyond said row of spacer portions, and which further includes a stake extending through said end expanses of said base portions, tying said base portions together and being capable of securing said base portions to the base of a trench.

* * * * *